United States Patent
Osinga et al.

(10) Patent No.: US 11,888,910 B1
(45) Date of Patent: Jan. 30, 2024

(54) SYSTEM TO PROVIDE A JOINT SPREADSHEET AND ELECTRONIC NOTEBOOK INTERFACE

(71) Applicant: Neptyne Inc, New York, NY (US)

(72) Inventors: Douwe Osinga, New York, NY (US); Jack Amadeo, Brooklyn, NY (US)

(73) Assignee: Neptyne Inc, New York, NY (US)

( * ) Notice: Subject to any disclaimer, the term of this patent is extended or adjusted under 35 U.S.C. 154(b) by 0 days.

(21) Appl. No.: 17/945,645

(22) Filed: Sep. 15, 2022

(51) Int. Cl.
*G06F 40/18* (2020.01)
*H04L 65/401* (2022.01)

(52) U.S. Cl.
CPC .......... *H04L 65/4015* (2013.01); *G06F 40/18* (2020.01)

(58) Field of Classification Search
None
See application file for complete search history.

(56) References Cited

U.S. PATENT DOCUMENTS

| | | | | |
|---|---|---|---|---|
| 8,930,812 B2 * | 1/2015 | Dargahi | ................ | G06F 40/166 715/255 |
| 11,507,738 B2 * | 11/2022 | Lereya | ............. | G06Q 10/06316 |
| 2017/0140047 A1 * | 5/2017 | Bendig | ................. | G06F 16/252 |
| 2022/0334857 A1 * | 10/2022 | Lam | ...................... | G06F 9/5077 |

FOREIGN PATENT DOCUMENTS

WO    WO-2023034328 A2 *    3/2023    ........... G06F 16/215

OTHER PUBLICATIONS

Sunny Solanki, "Interactive Spreadsheet in Jupyter Notebook using ipysheet", Apr. 7, 2020; retrived online from https://coderzcolumn.com/tutorials/python/interactive-spreadsheet-in-jupyter-notebook-using-ipysheet (Year: 2020).*

Ryan Noonan, "Python Jupyter Notebook Interactive Spreadsheets with ipysheet", Aug. 23, 2020, Full English transcript retrived online from https://www.youtube.com/watch?v=fKKtO1w77bg&t=1s (Year: 2020).*

Jupyter Team, "The Jupyter Notebook", 2015, retrived online from https://jupyter-notebook.readthedocs.io/en/stable/notebook.html# notebook-user-interface (Year: 2015).*

(Continued)

*Primary Examiner* — Hitesh Patel
*Assistant Examiner* — Sandarva Khanal
(74) *Attorney, Agent, or Firm* — Esplin & Associates, PC (57) ABSTRACT

Systems and methods for providing spreadsheet-formatted access to information stored within a hosted electronic notebook, in accordance with one or more implementations. Providing access to the hosted electronic notebook in a spreadsheet format may enhance usability for users who are more comfortable with a spreadsheet format, while still providing the features and functions of a stateful hosted electronic notebook. Providing access in the spreadsheet format may include presenting cell outputs of information cells within the hosted electronic notebook in an array with at least two dimensions. In other words, the information cells of the hosted electronic notebook may be organized and presented in the spreadsheet format to mimic at least some of the structure and function of a spreadsheet file that is stateful and hosted electronically.

14 Claims, 5 Drawing Sheets

(56) References Cited

OTHER PUBLICATIONS

Itay Dafna, "ipydatagrid adds interactive data grids to the Jupyter ecosystem", Dec. 8, 2021; retrived online from https://www.bloomberg.com/company/stories/ipydatagrid-adds-interactive-data-grids-to-the-jupyter-ecosystem/ (Year: 2021).*

Kevin McLaughlin, "How to Integrate Google Sheets and Jupyter Notebooks", Sep. 7, 2018; retrieved online from https://towardsdatascience.com/how-to-integrate-google-sheets-and-jupyter-notebooks-c469309aacea#:~:text=To%20allow%20your%20Jupyter%20notebook,Google%20Sheet%20and%20click%20Share. (Year: 2018).*

Dataschool, "Six easy ways to run your Jupyter Notebook in the cloud", Mar. 28, 201; retrieved online from https://www.dataschool.io/cloud-services-for-jupyter-notebook/ (Year: 2019).*

Mendez et al., "Toward collaborative open data science in metabolomics using Jupyter Notebooks and cloud computing"; Sep. 14, 2019, Springer; https://doi.org/10.1007/s11306-019-1588-0; retrieved online from https://link.springer.com/article/10.1007/s11306-019-1588-0 (Year: 2019).*

Visualstudio, Working with Jupyter code cells in the Python Interactive window; Dec. 1, 2021; retrieved online from https://code.visualstudio.com/docs/python/jupyter-support-py (Year: 2021).*

Tony Roberts; "Python Jupyter Notebooks in Excel"; Retrieved online on Sep. 23, 2023; Older version (posted on Dec. 12, 2020) is available for retrieving online from https://web.archive.org/web/20210311024315/https://www.pyxll.com/blog/python-jupyter-notebooks-in-excel/ (Year: 2020).*

Roberto Sannazzaro; "From spreadsheet to notebooks"; retrieved online on Sep. 23, 2023 from https://web.archive.org/web/20220522085438/https://deepnote.com/@roberto-sannazzaro/From-spreadsheet-to-notebooks-1c797c44-4373-4640-ba62-8e2c673aff52 (Year: 2022).*

Jing, "Connect your Jupyter Notebook to Google Spread Sheet"; https://jingsblogcom.wordpress.com/2018/12/03/connect-your-jupyter-notebook-to-google-spread-sheet/ [retrieved from the internet on Sep. 15, 2022]; Dec. 3, 2018 (8 pages).

Cornellius Yudha Wijaya "From Google Sheet to your Jupyter Notebook"; https://towardsdatascience.com/from-google-sheet-to-your-jupyter-notebook-ccdbf28fbf1b [retrieved from the internet on Sep. 15, 2022] Apr. 7, 2020 (16 pages).

"JupyterLab Spreadsheet"; Nine Pounds of Mayonnaise; https://www.npmjs.com/package/jupyterlab-spreadsheet [retrieved from the internet on Sep. 15, 2022]; Jul. 17, 2021 (5 pages).

"Interactive Spreadsheet in Jupyter Notebook using ipysheet" CoderzColumn; https://coderzcolumn.com/tutorials/python/interactive-spreadsheet-in-jupyter-notebook-using-ipysheet [retrieved from the internet on Sep. 15, 2022] Apr. 7, 2020 (6 pages).

"How to read excel file in jupyter notebook" Code Answer's Grepper; https://www.codegrepper.com/code-examples/python/how+to+read+excel+file+in+jupyter+notebook; [retrieved from the internet on Sep. 15, 2020] May 12, 2020 (21 pages).

* cited by examiner

SYSTEM TO PROVIDE A JOINT SPREADSHEET AND ELECTRONIC NOTEBOOK INTERFACE

FIELD OF THE DISCLOSURE

The present disclosure relates to providing spreadsheet-formatted access to information stored within a hosted electronic notebook.

BACKGROUND

Hosted electronic notebooks are known. For example, Jupyter Notebooks are used in a variety of contexts by researchers, programmers, analysts, and within other contexts. Spreadsheet files, on the other hand, are typically used within a dedicated viewing application to view information in a spreadsheet format, which is different from how content is displayed in a hosted electronic notebook. Several techniques for embedding spreadsheet files within a hosted electronic notebook are known. This merely results in the inclusion of a separate spreadsheet file within a hosted electronic notebook. Typically, only the information from the spreadsheet file is presented in a spreadsheet format.

SUMMARY

The present disclosure may be directed to providing spreadsheet-formatted access to information stored within a hosted electronic notebook, in accordance with one or more implementations. Providing access to the hosted electronic notebook in a spreadsheet format may enhance usability for users who are more comfortable with a spreadsheet format, while still providing the features and functions of a stateful hosted electronic notebook. Providing access in the spreadsheet format may include presenting cell outputs of information cells within the hosted electronic notebook in an array with at least two dimensions. In other words, the information cells of the hosted electronic notebook may be organized and presented in the spreadsheet format to mimic at least some of the structure and function of a spreadsheet file that is stateful and hosted electronically.

A system configured to provide spreadsheet-formatted access to information stored within a hosted electronic notebook. The system may include one or more servers in communication with one or more client computing platforms through which access to the hosted electronic notebook may be provided. The one or more servers may include one or more physical processors configured by machine-readable instructions to implement one or more of a notebook component, a spreadsheet assignment component, a spreadsheet representation component, a communications component, a user action receiving component, and/or other components.

The notebook component may be configured to implement an electronic notebook. The electronic notebook may include a sequence of separate and discrete information cells that individually contain information cell content. Information cell output associated with individual ones of the information cells may be determined by the notebook component. The information cells may collectively share a persistent state.

The spreadsheet assignment component may be configured to organize a set of the information cells into a spreadsheet format such that the individual information cells in the set of the information cells are assigned as values for a set of tabular variables. The set of tabular variables may define an array with at least two dimensions.

The spreadsheet representation component may be configured to determine a spreadsheet representation for presentation on an electronic display of the client computing platform. The spreadsheet representation may represent the information cell outputs of the set of the information cells as a spreadsheet array in accordance with the tabular variables for which the individual information cells are assigned as the values.

The communications component may be configured to initiate transmission of the spreadsheet representation to the client computing platform for presentation by the client computing platform. The communications component may be configured to receive user input via the client computing platform that includes a spreadsheet command that identifies one of the tabular variables and includes information cell content.

The user action receiving component may be configured to enter the information cell content from the user input to the information cell assigned to the tabular variable identified in the user input.

The notebook component may be further configured to update the persistent state collectively shared by the information cells based on the information cell content entered to the information cell assigned to the tabular variable identified in the user input. Such updating may include updating the information cell output of one or more of the information cells.

The spreadsheet representation component may be further configured to update the spreadsheet representation to include any changes in the information cell outputs in the updated persistent state collectively shared by the information cells.

The communications component may be further configured to initiate transmission of information to the client computing platform that causes the spreadsheet representation presented by the client computing platform to include such changes in the updated persistent state collectively shared by the information cells.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
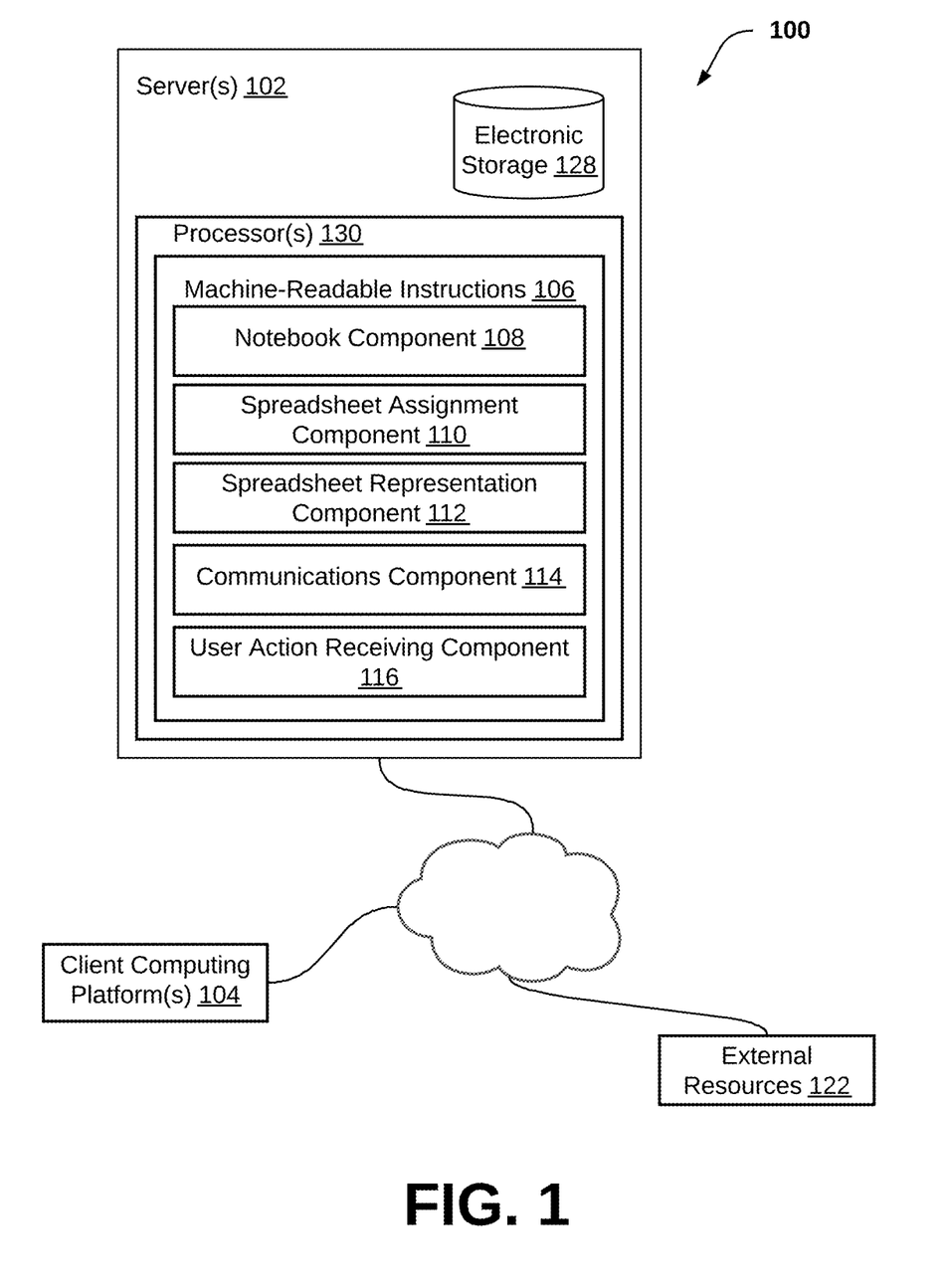
FIG. 1 illustrates a system configured to provide spreadsheet-formatted access to information stored within a hosted electronic notebook.

FIG. 1 illustrates a system 100 to provide spreadsheet-formatted access to information stored within a hosted electronic notebook, in accordance with one or more implementations. Providing access to the hosted electronic notebook in a spreadsheet format may enhance usability for users who are more comfortable with a spreadsheet format. Providing access in the spreadsheet format may include presenting cell outputs of information cells within the hosted electronic notebook in an array with at least two dimensions. In other words, the information cells of the hosted electronic notebook may be organized and presented in the spreadsheet format to mimic at least some of the structure and function of a spreadsheet file that is stateful and hosted electronically.

In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components and/or other units of computer programming code. The instruction components may include one or more of a notebook component 108, a spreadsheet assignment component 110, a spreadsheet representation component 112, a communications component 114, a user action receiving component 116, and/or other instruction components.

Notebook component 108 may implement an electronic notebook on server(s) 102. As used herein, a hosted electronic notebook may refer to an electronic environment that includes a sequence of separate and discrete information cells. The individual information cells may contain information cell content. The individual information cells may have individual information cell outputs. The information cell outputs may be associated with individual ones of the information cells. The information cell outputs of the information cells may be transmitted to client applications in a hosted manner over a network to share the information within the hosted electronic notebook. The information cells may collectively share a persistent state. Implementing the electronic notebook may include maintaining and updating the shared persistent state. The electronic notebook may be implemented using Jupyter Notebook, Google Colabatory, Deepnote, and/or other platforms.

Information cell content within an individual information cell may include one or more of an executable(s), text, media, a spreadsheet value, a file(s), an input widget, and/or other content. A spreadsheet value may include one or more of a number, a monetary amount, a time, a string, a Boolean, a spreadsheet output, and/or other values. A spreadsheet output may include representations of charts, graphs, tables, images, maps, diagrams and/or other graphics. An input widget may be in the form of a button, drop-down menu, slider, text-input box, file selector, checkbox and/or other forms that prompt users to provide input.

An executable may include instructions, an expression, script, code, and/or other materials that provide executable instructions for one or more processors. Notebook component 108 may be configured to execute any executable(s) included in the information cells as information cell content. Such executables may produce information cell output(s) for the one or more information cells that contain one or more executables. Other forms of information cell output are contemplated, as described herein. The individual information cell outputs produced by the executables may include one or more of text, numeric value, alphanumeric string, a graphic, a chart, a graph, a table, a map, a diagram, a value, a statement, a null value, and/or other forms of information. The individual information cells may include instructions and/or values that are usable by other information cells. For example, an individual information cell may include instructions and/or value(s) that are usable by other information cells in the form of a function call, a method call, a variable reference, and/or through other mechanisms. Determining a first information cell output for the first information cell may include executing a first instruction in the first information cell.

Determination of the cell output of a given information cell may rely on execution of one or more other information cells. For example, executing the information cell content in a first information cell may rely on instructions and/or variables defined in another information cell. The other information cell(s) may need to be executed prior to the first information cell in order to provide the first information cell with access to the instructions and/or variables in the other information cell. The information cells may be included within the notebook in a sequence in which the information cell content in the individual information cells is to be executed.

Figure 2:
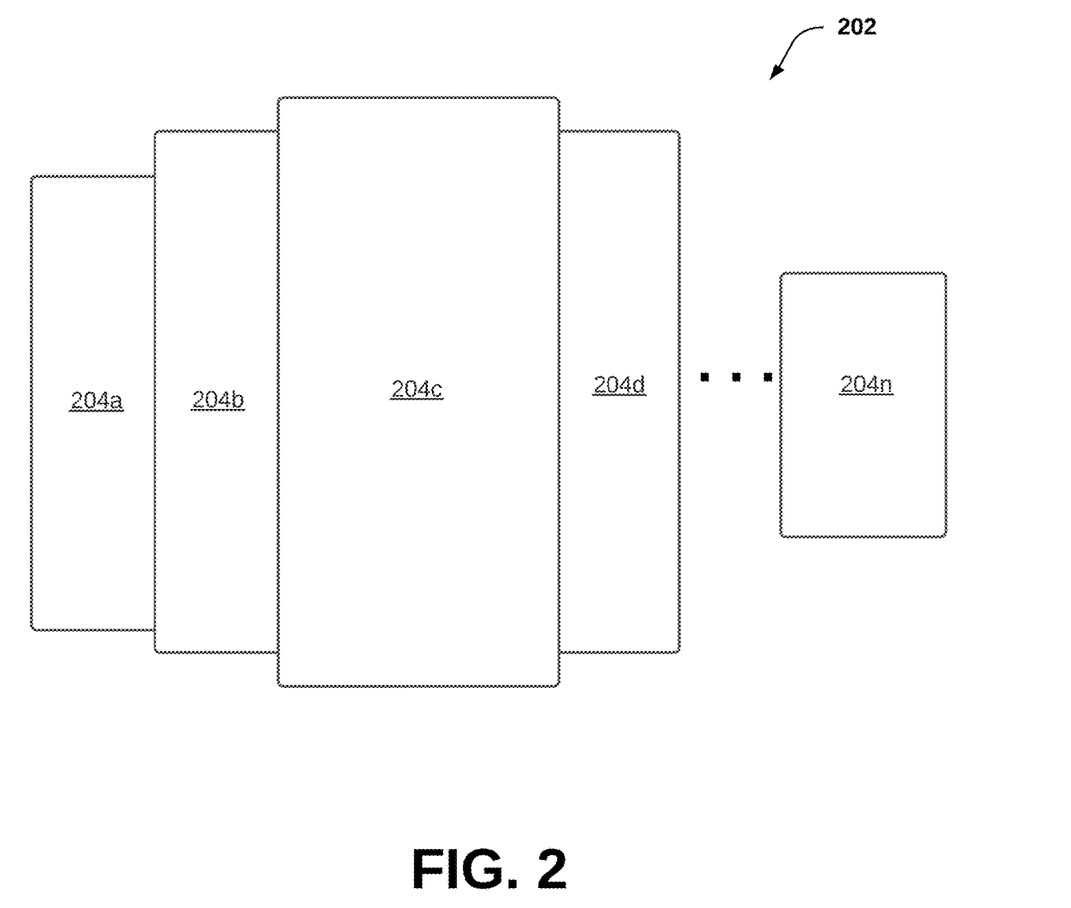
FIG. 2 illustrates an exemplary representation of a sequence of information cells.

By way of illustration, FIG. 2 depicts a sequence of information cells 202 represented as a one-dimensional array in a sequential order (e.g., left to right in FIG. 2). Sequence of information cells 202 may include individual information cells 204a-204n. As was mentioned above, the sequential order of the individual ones of information cells 204a-204n may impact an order in which cell content contained by information cells 204a-204n is executed. For example, the sequential order of information cells 204a-204n may be the same order in which cell content contained by information cells 204a-204n is executed. The information produced by executing cell content in information cell 204a may be used to determine a cell output for one or more of information cells 204b-204n. The sequential order of sequence of information cells 202 may be altered in response to user commands. For example, information cell 204c may be moved in the sequential order to a location before (e.g., to the left in FIG. 2) information cell 204a.

Determining the information cell output of an information cell may update the shared persistent state. Updating the shared persistent state may update the cell content and/or output of one or more of the information cells.

Returning to FIG. 1, spreadsheet assignment component 110 may be configured to organize the sequence of information cells so at least some of the information cells are arranged in the spreadsheet format. Spreadsheet assignment component 110 may assign correlations between individual ones of the information cells and individual ones of the elements in the array with at least two dimensions (e.g., such as one presented in a spreadsheet) of the spreadsheet format. These correlations may be assigned by designating individual information cells as the values for individual ones of the tabular variables in the set of tabular variables. Individual ones of the tabular variables may correspond to coordinates with at least two dimensions within the array with at least two dimensions of the spreadsheet format. By way of non-limiting example, the individual tabular variables may include a letter coordinate for a first dimension (e.g., a horizontal dimension, a column, or other dimension) and a number for a second dimension (e.g., a vertical dimension, a row, or other dimension). The designation of a given information cell as the value of a given tabular variable may assign a correlation between the given information cell and the element in the array with at least two dimensions of the spreadsheet format at the coordinates indicated by the given tabular variable.

Any description herein of the dimensionality of an array of spreadsheet format may refer to an array of up to n-dimensions. An n-dimensional array of the spreadsheet format may include a two-dimensional array, such as the ones described herein. However, specific descriptions and/or depictions of a two-dimensional array (e.g., a two-dimensional array of spreadsheet cells) may be further organized into additional dimensions (e.g., with a third dimension of m sheets of two-dimensional arrays of spreadsheet cells, and/or other dimensionalities) without departing from the scope of this disclosure. It should be appreciated that descriptions of the assignment of information cells to a set of tabular variables with respect to two-dimensions may be extended to a third dimension, and so on, by the inclusion of yet another tabular coordinate to the set of tabular coordinates.

Figure 4:
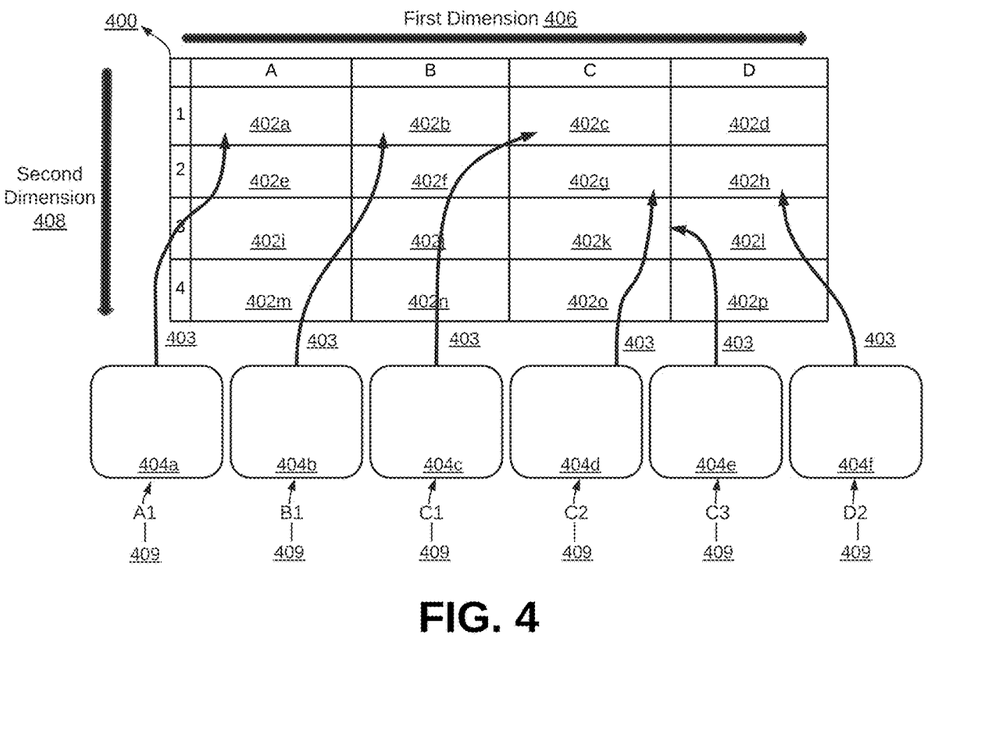
FIG. 4 illustrates an exemplary assignment of information cells to individual elements in a spreadsheet format.

By way of illustration, FIG. 4 depicts an exemplary assignment of correlations 403 between information cells 404a-404f to individual elements 402a-402p in a two-dimensional array 400 within the spreadsheet format. Information cells 404a-404f may be the same as or similar to information cells 204a-204f (shown in FIG. 2 and described herein). Two-dimensional array 400 may include a first dimension 406 and a second dimension 408. As is illustrated in FIG. 4, coordinates along first dimension 406 may be designated by letters (e.g., A, B, C, D, and so forth). Coordinates along second dimension 408 may be designated by numbers (e.g., 1, 2, 3, 4, and so forth). These designations are merely illustrative.

FIG. 4 connotes assignment of information cells 404a-404f as values for tabular variables 409, which may effectuate correlations 403. Consecutive information cells 404a-404c may be assigned as values for tabular variables 409 such that information cells 404a-404c are correlated in order along first dimension 406 with elements 402a-402c, respectively, in two-dimensional array 400. Consecutive information cells 404c-404e may be assigned as values for tabular variables 409 such that information cells 404c-404e are correlated in order along second direction 408 with elements 402c, 402g, and 402k, respectively, in two-dimensional array 400. Information cell 404f may be assigned as a value for one of tabular variables 409 such that information cell 404f is correlated with element 402h in two-dimensional array 400 without regard to the order of information cells 404a-e.

Assignment of a given information cell as the value of a tabular variable may facilitate a variety of different functionality. Such functionality may include facilitating users to access, edit, manipulate, or otherwise interact with specific ones of the information cells. The assignment of the given information cell with the tabular variable may set the position within an array with at least two dimensions of the spreadsheet representation presented to users through client computing platforms 104, may enable users to edit (e.g., enter, delete, edit, etc.) cell content of the given information cell by referencing the corresponding tabular variable, may enable users to edit cell style of a given element in the array with at least two dimensions of the spreadsheet representation, may enable the information cell content of another information cell to reference the information cell content (and/or content generated through execution of the information cell content) of the given information cell, and/or provide other functionality. Cell style may refer to one or more of a font type, a font size, a cell color, a cell border type, a cell border style, and or other visual characteristics displayed in individual elements in the array with at least two dimensions of the spreadsheet representation.

Returning to FIG. 1, spreadsheet representation component 112 may be configured to determine a spreadsheet representation of the hosted electronic notebook for presentation (e.g., via client computing platform(s) 104). Determination of the spreadsheet representation may include arranging the cell outputs of the information cells of the hosted electronic notebook into the array with at least two dimensions of the spreadsheet representation. Determination of the spreadsheet representation may further include determining cell styles of the elements in the array with at least two dimensions of the spreadsheet representation. The cell outputs of the information cells and the cell styles of the elements in the array with at least two dimensions of the spreadsheet representation may be obtained from the shared persistent state of the hosted electronic notebook and/or from execution of cell content within the information cells.

Execution of cell content within the information cells may update the shared persistent state of the hosted electronic notebook. Execution of cell content within an individual information cell may trigger the execution of cell content in one or more other information cells according to the updated shared persistent state. The cell outputs may be arranged into the array with at least two dimensions of the spreadsheet representation. Arranging the cell outputs may include positioning the cell outputs of the information cells at coordinates in the array with at least two dimensions designated by the tabular variables for which the information cells have been assigned as values.

Figure 3:
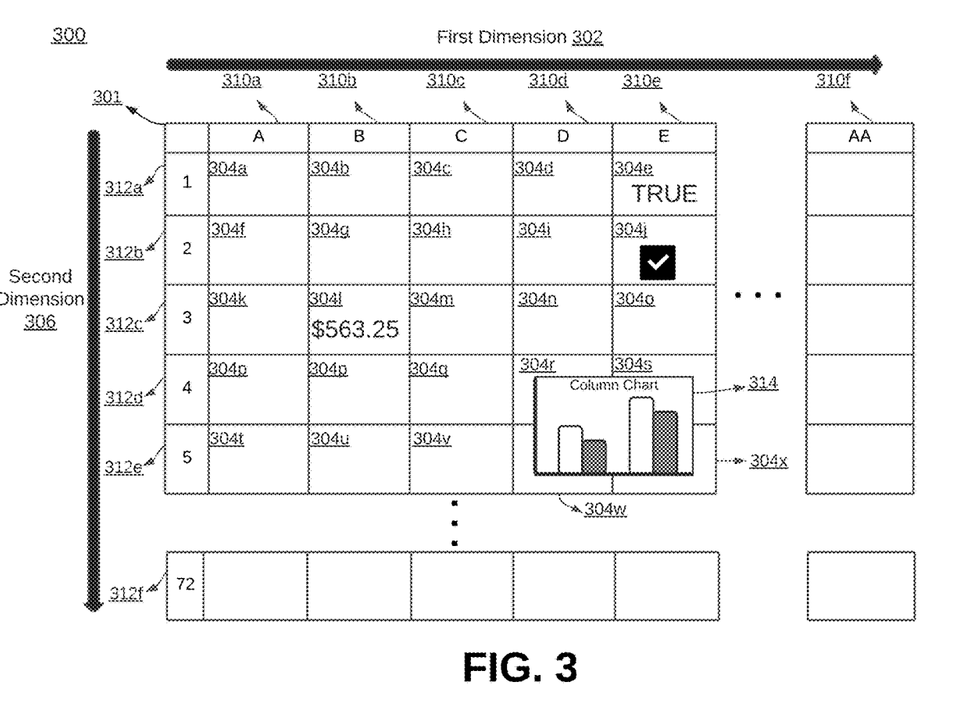
FIG. 3 illustrates an exemplary spreadsheet representation.

By way of illustration, FIG. 3 depicts an exemplary spreadsheet representation 300 as a two-dimensional array 301. Spreadsheet representation 300 may include spreadsheet representation elements 304a-304x. Different information cells of the hosted electronic notebook may be correlated to individual ones of spreadsheet representation elements 304a-304x (e.g., the same as or similar to what is shown in FIG. 4 and described herein). As such, the individual spreadsheet representation elements 304a-304x may be identifiable by coordinates in first dimension 302 and second dimension 306. A given information cell may be correlated with one of spreadsheet representation elements 304a-304x by assignment as the value for a tabular variable designating the coordinates of the correlated one of spreadsheet representation elements 304a-304x.

As shown in FIG. 3, spreadsheet representation 300 may include presentations of spreadsheet values. Spreadsheet representation element 304j may contain a checkbox representing a spreadsheet value with the Boolean value of True. A user may update the spreadsheet format with a spreadsheet command by toggling the checkbox. Spreadsheet representation element 304e and spreadsheet representation element 304j may both contain spreadsheet values in the form of Booleans. Spreadsheet representation element 304l may contain a spreadsheet value in the form of a dollar amount.

Spreadsheet representation 300 includes an exemplary depiction of a spreadsheet value in the form of a spreadsheet output. Spreadsheet representation 300 includes column chart 314 displayed on top of spreadsheet representation elements 304r, 304s, 304w, and 304x. Column chart 314 may be a spreadsheet output in the form of a chart. The depiction of column chart 314 is not intended to be limiting. Spreadsheet representation 300 may include one or more other spreadsheet outputs in the forms of charts, graphs, tables, images, maps, diagrams and/or other graphical forms. These one or more other spreadsheet outputs may displayed be on top of larger and/or smaller portions of the spreadsheet representation elements 304a-304x and in various positions in spreadsheet representation 300.

Spreadsheet representation 300 may include coordinate labels along one or both of first dimension 302 and/or second dimension 306. First dimension 302 may be depicted as a horizontal dimension having first-dimension labels 310a-310f labeled by one or more letters. First-dimension labels 310a-310f may be used to identify one or more columns in the spreadsheet representation. Second dimension 306 may be depicted as a vertical dimension having second-dimension labels 312a-312f labeled by numbers. The second-dimension labels 312a-312f may be used to identify one or more rows in the spreadsheet representation.

First-dimension label 310f may be an example of a first-dimension label being denoted by two letters. There may be first-dimension labels between first-dimension label 310e and first-dimension label 310f that are not pictured. The first-dimension labels 310a-310f and the second-dimension labels 312a-312f may be used together to identify one or more spreadsheet representation elements 304a-304x. By way of non-limiting example, spreadsheet representation element 304d may be identified as D1 by combining first-dimension label 310d and second-dimension label 312a.

The illustration of the spreadsheet representation in FIG. 3 is not intended to be limiting. The spreadsheet representation 300 may be an m-by-n matrix where m and n are integer values greater than or equal to 1. The spreadsheet representation 300 may be a two-dimensional array following a grid layout. The first-dimension labels 310a-310f and the second-dimension labels 312a-312f may be labelled by one or more letters, numbers, and/or other forms.

Returning to FIG. 1, user action receiving component 116 may be configured to receive user input. User input may be received from one or more of client computing platforms 104 being used to access the spreadsheet representation of the hosted electronic notebook. User input from client computing platforms 104 may be communicated to user action receiving component 116 via a network. Such user input may include one or more spreadsheet commands. A spreadsheet command may include an identification of one of the tabular variables and cell content. User action receiving component 116 may be configured to include the cell content from the spreadsheet command in the information cell assigned as the value to the tabular variable included in the spreadsheet command. The cell content may include any of the types or forms of cell content described herein. Inclusion of the cell content to the information cell assigned as the value to the tabular variable included in the spreadsheet command may cause a change to the shared persistent state of the hosted electronic notebook. Such a change to the shared persistent state of the hosted electronic notebook may cause notebook component 108 to update the shared persistent state. In some instances, this may include updating cell content within one or more other information cells that rely on and/or refer to the cell content of the information cell assigned as the value of the variable included in the spreadsheet command. The update of the shared persistent state may cause spreadsheet representation component 112 to update the spreadsheet representation. This may include determining updated cell outputs for one or more of the information cells, updating the spreadsheet representation to reflect such change(s), and/or other actions.

Communications component 114 may be configured to communicate information between server 102 and client computing platforms 104. This may include initiating transmission of information to client computing platforms 104 that facilitates presentation of the spreadsheet representation on client computing platforms 104, and/or updates thereto.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, and/or other components. Processor(s) 130 may be configured to execute components 108, 110, 112, 114, 116, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 130 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 130 may be configured to execute one or more additional components that may perform some or all of the functionality attributed below to one of components 108, 110, 112, 114, and/or 116.

Figure 5:
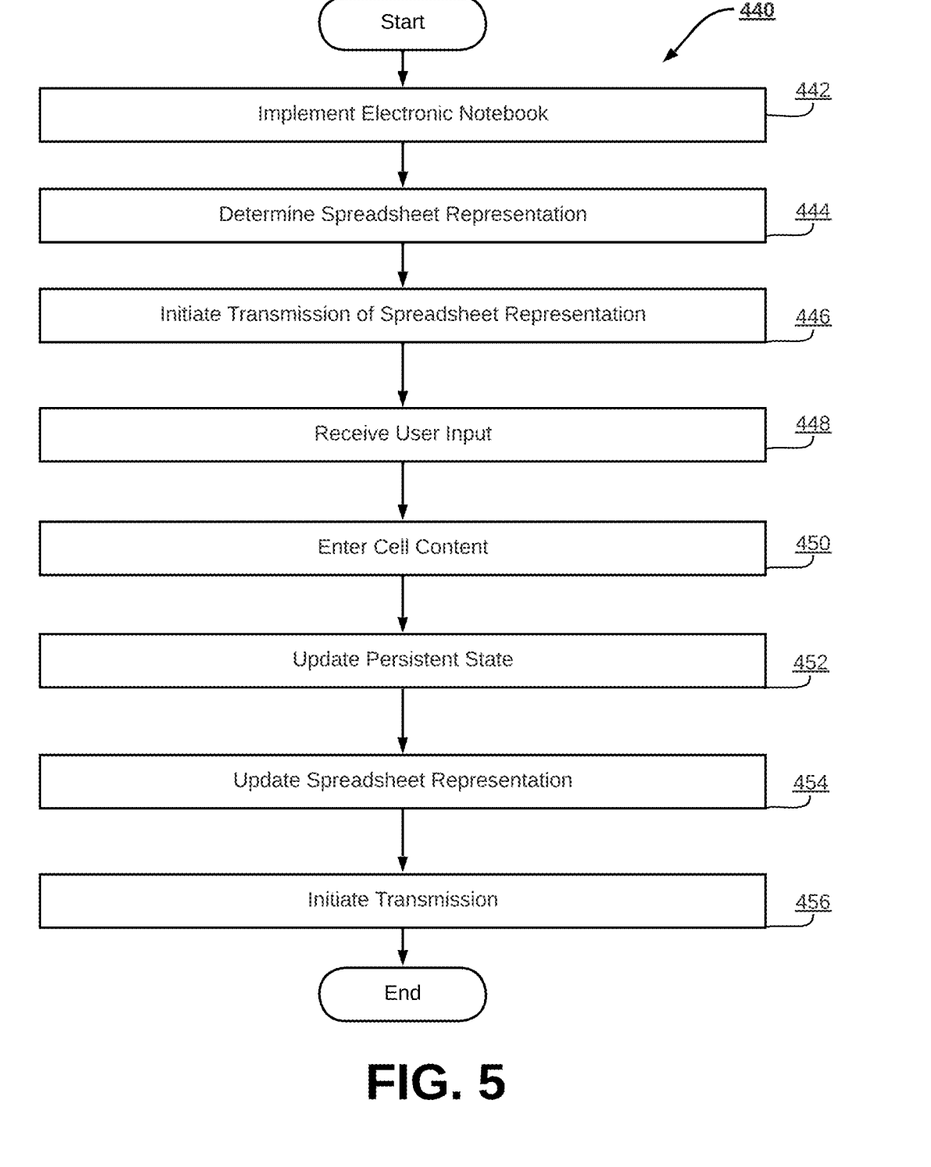
FIG. 5 illustrates a method configured to provide spreadsheet-formatted access to information stored within a hosted electronic notebook.

FIG. 5 illustrates method 440 of providing spreadsheet-formatted access to information stored within a hosted electronic notebook. The operations of method 440 presented below are intended to be illustrative. In some implementations, method 440 may be accomplished with one or more additional operations not described, and/or without one or more of the operations discussed. In some implementations, two or more of the operations may occur substantially simultaneously.

In some implementations, method 440 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 440 in response to instructions stored electronically on one or more electronic storage mediums. The one or more processing devices may include one or more devices configured through hardware, firmware, and/or software to be specifically designed for execution of one or more of the operations of method 440.

At an operation 442, a hosted electronic notebook may be implemented. The hosted electronic notebook may include a sequence of information cells that individually contain cell content. Information cell output may be associated with individual ones of the information cells. The information cells may collectively share a persistent state. The hosted electronic notebook may be implemented by a notebook component that is the same as or similar to notebook component 108 (shown in FIG. 1 and described herein). A set of the information cells may be organized into a spreadsheet format in that they may be assigned as values for a set of tabular variables. The organization of the set of information cells may be accomplished by a spreadsheet assignment component that is the same as or similar to spreadsheet assignment component 110 (shown in FIG. 1 and described herein).

At an operation 444, a spreadsheet representation of the cell outputs of the set of information cells may be determined. Operation 444 may be accomplished by a spreadsheet representation component that is the same as or similar to spreadsheet representation component 112 (shown in FIG. 1 and described herein).

At an operation 446, transmission of the spreadsheet representation may be initiated to one or more client computing platforms for display thereon. Operation 446 may be accomplished by a communications component that is the same as or similar to communications component 114 (shown in FIG. 1 and described herein).

At an operation 448, user input via the client computing platform may be received. The user input may include a spreadsheet command. Operation 448 may be accomplished by a communications component that is the same as or similar to communications component 114 (shown in FIG. 1 and described herein).

At an operation 450, cell content included in the spreadsheet command from the user input received at operation 448 may be input to an information cell assigned as the value to a tabular variable included in the same spreadsheet command. Operation 450 may be accomplished by a user action receiving component that is the same as or similar to user action receiving component 116 (shown in FIG. 1 and described herein).

At an operation 452, the persistent state collectively shared by the information cells may be updated in accordance with the cell content input at operation 450. Operation 452 may be accomplished by a notebook component that is the same as or similar to notebook component 108 (shown in FIG. 1 and described herein).

At an operation 454, the spreadsheet representation may be updated to reflect the updated persistent state collectively shared by the information cells. Operation 454 may be performed by a spreadsheet representation component that is the same as or similar to spreadsheet representation component 112 (shown in FIG. 1 and described herein).

At an operation 456, transmission of information to the client computing platform causes the spreadsheet representation presented by the client computing platform to include such changes in the updated persistent state collectively shared by the information cells. Operation 456 may be performed by a communications component that is the same as or similar to communications component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide spreadsheet-formatted access to information stored within a hosted electronic notebook, the system comprising:
    one or more physical computer processors configured by machine-readable instructions to:
        implement an electronic notebook that includes a sequence of separate and discrete information cells that individually contain information cell content, wherein information cell output is associated with individual ones of the information cells, wherein the information cells collectively share a persistent state, and wherein a set of the information cells are organized into a spreadsheet format such that individual information cells in the set of the information cells are assigned as values for a set of tabular variables, the set of tabular variables defining an array with at least two dimensions, wherein the individual ones of the tabular variables individually correspond to coordinate positions in the array;
        determine a spreadsheet representation for presentation on an electronic display that represents information cell outputs of the set of the information cells as a spreadsheet array in accordance with tabular variables included in the set of tabular variables for which the individual information cells are assigned as the values such that correlations are formed between individual ones of the information cells from the electronic notebook and individual ones of positions in the spreadsheet array, the correlations being formed between a given information cell assigned a given tabular variable and a given position in the spreadsheet array that has coordinates that are the same as the given tabular variable assigned to the given information cell, wherein determining the spreadsheet representation includes determining separate ones of the information cell outputs of one or more of the individual information cells included in the set of the information cells;
        initiate transmission of the spreadsheet representation to a client computing platform for presentation by the client computing platform;
        receive user input via the client computing platform that includes a spreadsheet command that identifies the given tabular variable and includes information cell content;
        responsive to receipt of the user input, enter the information cell content from the user input to the given information cell assigned to the given tabular variable as identified in the spreadsheet command;
        update the persistent state collectively shared by the information cells responsive to the information cell content being entered to the information cell assigned to the tabular variable identified in the user input, wherein such updating includes updating the information cell output of one or more of the information cells;
        update the spreadsheet representation to include any changes in the information cell outputs in the updated persistent state collectively shared by the information cells responsive to the persistent state being updated, wherein updating the spreadsheet representation includes updating the information cell outputs of the one or more of the individual information cells in the spreadsheet representation; and
        initiate transmission of information to the client computing platform that causes the spreadsheet representation presented by the client computing platform to include such changes in the updated persistent state collectively shared by the information cells.

2. The system of claim 1, wherein the set of the information cells includes a first information cell assigned as the value of a first variable in the set of tabular variables, wherein the information cell content in the first information cell includes a first expression, and wherein determining a first information cell output for the first information cell includes executing the first expression.

3. The system of claim 2, wherein the set of the information cells includes a second information cell assigned as the value of a second variable in the set of tabular variables, wherein the first expression includes the second variable, and wherein, by virtue of the inclusion of the second variable in the first expression, execution of the first expression includes implementing information cell content from the second information cell or using information derived from the information cell content in the second information cell as a value of the second variable.

4. The system of claim 1, wherein the set of the information cells includes all information cells in the notebook file such that each information cell is assigned as the value of a variable in the set of tabular variables.

5. The system of claim 1, wherein the set of the information cells includes some of the information cells in the notebook such that each information cell in the set of information cells is assigned as the value of a variable in the set of tabular variables, wherein the information cells in the notebook file contain operations and variables for use by other cells within the notebook file.

6. The system of claim 1, wherein the notebook file includes variables and instructions used for assignment of the information cells.

7. The system of claim 1, wherein the spreadsheet format includes the values or executable instructions to obtain the values and outputs of the information cells to be included in the spreadsheet representation.

8. A method for providing spreadsheet-formatted access to information stored within a hosted electronic notebook, the method comprising:
  implementing an electronic notebook that includes a sequence of separate and discrete information cells that individually contain information cell content, wherein information cell output is associated with individual ones of the information cells, wherein the information cells collectively share a persistent state, and wherein a set of the information cells are organized into a spreadsheet format such that individual information cells in the set of the information cells are assigned as values for a set of tabular variables, the set of tabular variables defining an array with at least two dimensions, wherein the individual ones of the tabular variables individually correspond to coordinate positions in the array;
  determining a spreadsheet representation for presentation on an electronic display that represents information cell outputs of the set of the information cells as a spreadsheet array in accordance with tabular variables included in the set of tabular variables for which the individual information cells are assigned as the values such that correlations are formed between individual ones of the information cells from the electronic notebook and individual ones of positions in the spreadsheet array, the correlations being formed between a given information cell assigned a given tabular variable and a given position in the spreadsheet array that has coordinates that are the same as the given tabular variable assigned to the given information cell, wherein determining the spreadsheet representation includes determining separate ones of the information cell outputs of one or more of the individual information cells included in the set of the information cells;
  initiating transmission of the spreadsheet representation to a client computing platform for presentation by the client computing platform;
  receiving user input via the client computing platform that includes a spreadsheet command that identifies the given tabular variable and includes information cell content;
  responsive to receipt of the user input, entering the information cell content from the user input to the given information cell assigned to the given tabular variable as identified in the spreadsheet command;
  updating the persistent state collectively shared by the information cells responsive to the information cell content being entered to the information cell assigned to the tabular variable identified in the user input, wherein such updating includes updating the information cell output of one or more of the information cells, wherein updating the spreadsheet representation includes updating the information cell outputs of the one or more of the individual information cells in the spreadsheet representation;
  updating the spreadsheet representation to include any changes in the information cell outputs in the updated persistent state collectively shared by the information cells responsive to the persistent state being updated; and
  initiating transmission of information to the client computing platform that causes the spreadsheet representation presented by the client computing platform to include such changes in the updated persistent state collectively shared by the information cells.

9. The method of claim 8, wherein the set of the information cells includes a first information cell assigned as the value of a first variable in the set of tabular variables, wherein the information cell content in the first information cell includes a first expression, and wherein determining a first information cell output for the first information cell includes executing the first expression.

10. The method of claim 9, wherein the set of the information cells includes a second information cell assigned as the value of a second variable in the set of tabular variables, wherein the first expression includes the second variable, and wherein, by virtue of the inclusion of the second variable in the first expression, execution of the first expression includes implementing information cell content from the second information cell or using information derived from the information cell content in the second information cell as a value of the second variable.

11. The method of claim 8, wherein the set of the information cells includes all information cells in the notebook file such that each information cell is assigned as the value of a variable in the set of tabular variables.

12. The method of claim 8, wherein the set of the information cells includes some of the information cells in the notebook such that each information cell in the set of information cells is assigned as the value of a variable in the set of tabular variables, wherein the information cells in the notebook file contain operations and variables for use by other cells within the notebook file.

13. The method of claim 8, wherein the notebook file includes variables and instructions used for assignment of the information cells.

14. The method of claim 8, wherein the spreadsheet format includes the values or executable instructions to obtain the values and outputs of the information cells to be included in the spreadsheet representation.

* * * * *